United States Patent Office 3,226,434
Patented Dec. 28, 1965

3,226,434
PREPARATION OF NEUTRAL 6-DEMETHYL-7-CHLOROTETRACYCLINE
Panayota Bitha, New York, N.Y., and Neil Edward Rigler, Ridgewood, N.J., assignors to American Cyanamid Company, Stamford, Conn., a corporation of Maine
No Drawing. Filed Dec. 4, 1962, Ser. No. 242,037
4 Claims. (Cl. 260—559)

This invention relates to the preparation of neutral 6-demethyl-7-chlorotetracycline and, more particularly, is concerned with an improved process of converting 6-demethyl-7-chlorotetracycline hydrochloride to neutral 6-demethyl-7-chlorotetracycline in a two-phase solvent system.

In United States Patent No. 3,053,893 to Muller there is disclosed a process of purifying 6-demethyl-7-chlorotetracycline which involves dissolving crude 6-demethyl-7-chlorotetracycline in an aqueous solution of urea and sulfate ions whereby a 6-demethyl-7-chlorotetracycline-urea-sulfate complex is formed. The undissolved impurities are removed by filtration and, by readjusting the pH of the filtrate with aqueous base, 6-demethyl-7-chlorotetracycline is regenerated from the complex and precipitates. The product is then removed by simple filtration. However, this method while it produces a high quality therapeutically useful product is not without certain disadvantages, notably in that it involves a two step process.

In accordance with the present invention we have discovered a simple process for converting 6-demethyl-7-chlorotetracycline hydrochloride to neutral 6-demethyl-7-chlorotetracycline that is practical, cheap and efficient to carry out. Surprisingly, we have discovered that a high quality, high potency 6-demethyl-7-chlorotetracycline neutral product can be produced economically by an easy to handle solid-to-solid conversion technique which utilizes an aqueous suspension of 6-demethyl-7-chlorotetracycline hydrochloride as the starting material.

In accordance with the present invention, 6-demethyl-7-chlorotetracycline hydrochloride is suspended in water and the aqueous suspension is treated with a solution of a liquid mixture of high molecular weight amines dissolved in a water immiscible solvent. For optimum results we prefer to use two volumes of aqueous suspension to one volume of the water immiscible solvent solution of the liquid mixture of high molecular weight amines but we may use from 50–75% water to 50–25% solvent solution. Sufficient of the liquid mixture of high molecular weight amines is employed so as to adjust the apparent pH of the two-phase solvent system to between 3.0 and 4.5 while vigorous stirring is maintained, preferably at room temperature. The two-phase solvent system is stirred at room temperature for a period of from about one to about eight hours or until the conversion to neutral 6-demethyl-7-chlorotetracycline is complete. Thereupon the neutral product is removed by filtration, washed with water, and dried in vacuo in the usual manner.

The liquid mixtures of high molecular weight amines which are operable in the process of the present invention are composed of amines having the empirical formula:

$$C_nH_{2n+3}N$$

wherein $n$ has the value of from 12 to 26. Amines according to this definition have a molecular weight range of from about 200 to about 400. The mixture of high molecular weight amines may be composed of any number of such amines in any proportion so long as the resultant mixture is a liquid. Amines according to the above definition which may be used in preparing the liquid mixtures of high molecular weight amines may be, for example, n-dodecyclamine, n-tridecylamine, myristylamine, n-pentadecylamine, cetylamine, n-heptadecylamine, stearylamine, 3-aminomethylundecane, 4-aminomethylundecane, 5-aminomethylundecane, 1-amino-2-methyldodecane, 3-amino-3-ethylundecane, 12-amino-2,6,10-trimethyldodecane, n-eicosylamine, n-docosylamine, di-n-valerylamine, diisolvalerylamine, di-n-caprylamine, diisocaprylamine, di(2-ethylhexyl)amine, tricaprylamine, dimethylcetylamine, diethylcetylamine, 3-(dimethylaminomethyl)undecane, 4 - (dimethylaminomethyl)undecane, 5-(dimethylaminomethyl)undecane and 12-(dimethylaminomethyl)-2,6,10-trimethyldodecane. It is clear that many other amines according to the above definition, operable in the present invention, would be obvious to those skilled in the art.

Liquid mixtures of high molecular weight amines operable in the present invention are also commercially available under the brand names Primene JM–T and Amberlite LA–2 which may be obtained from the Rohm & Haas Company; and under the brand name Alamine 336 which may be obtained from the General Mills Corporation. Primene JM–T is a mixture of primary aliphatic amines with highly branched alkyl chains in which the primary amino nitrogen is directly attached to a tertiary carbon atom, the formulation being principally $C_{18}H_{37}NH_2$ to $C_{22}H_{45}NH_2$ and being in the molecular weight range of 269–325. Amberlite LA–2 is a mixture of secondary aliphatic amines in the molecular weight range of 353–395. Alamine 336 is a mixture of tertiary aliphatic amines with tricaprylamine predominating.

The water immiscible solvents which are preferred in the novel process of the present invention are inert hydrocarbon solvents having a boiling range of 30°–110° C. However, other solvents such as toluene, 1,2-dichloroethane, cyclohexane or amyl acetate may also be used. It is only essential that the solvents have a very low solubility in water.

It is a desirable feature of this invention that the amine mixture dissolved in the organic water immiscible solvent can be reused. For this purpose, the upper phase of the filtrate obtained after removing the 6-demethyl-7-chlortetracycline neutral is separated. This phase contains the hydrochlorides of the amine mixture and various colored impurities. It is purified by washing with strong caustic solution and then with water. The solution of the amine mixture in the organic solvent thus obtained can now be reused.

The invention will be described in greater detail in conjunction with the following specific examples.

EXAMPLE 1

*The production of 6-demethyl-7-chlorotetracycline neutral utilizing Amberlite LA–2*

The grams of 6-demethyl-7-chlorotetracycline hydrochloride assaying 964 mcg./mg. were suspended in 100 ml. of water. The pH of this suspension was carefully adjusted to 4.0 by the addition of 30–40 ml. of a solution of equal volumes of Amberlite LA–2 and commercial heptane at 26° C. After a period of 15 minutes the pH was read again and readjusted to 4.0 by the addition of more Amberlite LA–2 solution. The pH was not permitted to go above 4.1. The crystals thus formed were collected after 4 hours of stirring and were washed with 15 ml. of commercial heptane. The crystals were dried at 40° C. under a pressure of 2.5 mm. of mercury for about 16 hours. The product consisted of 8.9 grams of light yellow colored 6-demethyl-7-chlorotetracycline neutral assaying 1001 mcg./mg. (as 6-demethyl-7-chlorotetracycline hydrochloride on an "as is" basis) by the standard Hiscox method representing a yield of 92.5%.

EXAMPLE 2

*The production of 6-demethyl-7-chlorotetracycline neutral utilizing Primene JM–T*

Ten grams of 6-demethyl-7-chlorotetracycline hydrochloride assaying 977 mcg./mg. were suspended in 100 ml. of water. The pH of this suspension was carefully adjusted to 4.0 by the addition of 14–18 ml. of a solution of equal volumes of Primene JM–T and commercial heptane at 26° C. After a period of 15 minutes the pH was read again and readjusted to 4.0 by the addition of more Primene JM–T solution. The pH was not allowed to go above 4.1. The crystals thus formed were collected after 4 hours of stirring and were washed with 15 ml. of commercial heptane. The crystals were dried at 40° C. under a pressure of 2.5 mm. of mercury for about 16 hours. The product consisted of 8.58 grams of light yellow colored 6-demethyl-7-chlorotetracycline neutral assaying 1073 mcg./mg. (as the hydrochloride on an "as is" basis) by the standard Hiscox method, representing a yield of 94.0%.

EXAMPLE 3

*The production of 6-demethyl-7-chlorotetracycline neutral utilizing di-(2-ethylhexyl)amine*

Ten grams of 6-demethyl-7-chlorotetracycline hydrochloride assaying 940 mcg./mg. were suspended in 100 ml. of water. The pH of this suspension was carefully adjusted to 4.0 by the addition of 14 ml. of a solution of equal volumes of di-(2-ethylhexyl)amine and commercial heptane at 26° C. After a period of 15 minutes the pH was read again and readjusted to 4.0 by the addition of more di-(2-ethylhexyl)amine solution. The pH was not permitted to go above 4.1. The crystals thus formed were collected after 4 hours of stirring and washed with three 10 ml. portions of commercial heptane. The crystals were dried at 40° C. under a pressure of 2.5 mm. of mercury for about 16 hours. The product consisted of 8.12 grams of light yellow colored 6-demethyl-7-chlorotetracycline neutral assaying 1075 mcg./mg. (as the hydrochloride on an "as is" basis) by the standard Hiscox method, representing a yield of 93.0%.

EXAMPLE 4

*The production of 6-demethyl-7-chlorotetracycline neutral utilizing Primene JM–T*

Ten grams of 6-demethyl-7-chlorotetracycline hydrochloride assaying 995 mcg./mg. were suspended in 100 ml. of water. The pH of this suspension was carefully adjusted to 4.0 by the addition of a solution of equal volumes of Primene JM–T and cyclohexane at 26° C. After a period of 15 minutes the pH was read again and readjusted to 4.0 by the addition of more Primene JM–T solution. The pH was not permitted to go above 4.1. The crystals thus formed were collected after four hours of stirring and were washed with cyclohexane. The crystals were dried at 40° C. under a pressure of 2.5 mm. of mercury for about 16 hours. The product consisted of light yellow colored 6-demethyl-7-chlorotetracycline neutral in a yield of 94.5% (calculated as the hydrochloride on an "as is" basis).

EXAMPLE 5

*The production of 6-demethyl-7-chlorotetracycline neutral utilizing Primene JM–T*

Ten grams of 6-demethyl-7-chlorotetracycline hydrochloride assaying 995 mcg./mg. were suspended in 100 ml. of water. The pH of this suspension was carefully adjusted to 4.0 by the addition of a solution of equal volumes of Primene JM–T and toluene at 26° C. After a period of 15 minutes the pH was read again and readjusted to 4.0 by the addition of more Primene JM–T solution. The pH was not permitted to go above 4.1. The crystals thus formed were collected after four hours of stirring and were washed with cyclohexane. The crystals were dried at 40° C. under a pressure of 2.5 mm. of mercury for about 16 hours. The product consisted of light yellow colored 6-demethyl-7-chlorotetracycline neutral in a yield of 91.2% (calculated as the hydrochloride on an "as is" basis).

EXAMPLE 6

*The production of 6-demethyl-7-chlorotetracycline neutral utilizing Primene JM–T*

Ten grams of 6-demethyl-7-chlorotetracycline hydrochloride assaying 995 mcg./mg. were suspended in 100 ml. of water. The pH of this suspension was carefully adjusted to 4.0 by the addition of a solution of equal volumes of Primene JM–T and amyl acetate at 26° C. After a period of 15 minutes the pH was read again and readjusted to 4.0 by the addition of more Primene JM–T solution. The pH was not permitted to go above 4.1. The crystals thus formed were collected after 4 hours of stirring and were washed with amyl acetate. The crystals were dried at 40° C. under a pressure of 2.5 mm. of mercury for about 16 hours. The product consisted of light yellow colored 6-demethyl-7-chlorotetracycline neutral in a yield of 91.2% (calculated as the hydrochloride on an "as is" basis).

EXAMPLE 7

*The use of recycled Amberlite LA–2 in the production of 6-demethyl-7-chlorotetracycline neutral*

Ten grams of 6-demethyl-7-chlorotetracycline hydrochloride were suspended in 100 ml. of water. The pH of this suspension was carefully adjusted to 4.0 by the addition of a solution of equal parts of Amberlite LA–2 and commercial heptane at 26° C. After 15 minutes the pH was readjusted to 4.0 by the addition of more Amberlite LA–2 solution. The pH was not permitted to go above 4.1. The crystals thus formed were collected after 4 hours of stirring.

The organic phase of the filtrate was separated and washed with 15 ml. of 10% sodium hydroxide solution and then with 10 ml. of water. The colored impurities were transferred into the aqueous phase during this process. This recycled organic phase plus 5 ml. of fresh Amberlite LA–2 was used to adjust the pH of a suspension of 10 grams of 6-demethyl-7-chlorotetracycline hydrochloride (assaying 1034 mcg./mg.) in 100 ml. of water to 4.0 at 26° C. After a period of 15 minutes the pH was read again and readjusted to 4.0 by the addition of more recycled Amberlite LA–2 solution. The pH was not permitted to go above 4.1. The crystals thus formed were collected after 4 hours of stirring and were washed with commercial heptane. The crystals were dried at 40° C. under vacuum pressure of 2.5 mm. of mercury for about 16 hours. The product consisted of light yellow colored 6-demethyl-7-chlorotetracycline neutral in a yield of 94.5% (calculated as the hydrochloride on an "as is" basis).

EXAMPLE 8

*The production of 6-demethyl-7-chlorotetracycline neutral utilizing Alamine 336*

Ten grams of 6-demethyl-7-chlorotetracycline hydrochloride assaying 1070 mcg./mg. were suspended in 100 ml. of water. An attempt was made to raise the pH of this solution to 4.0 by the addition of a mixture of 63 ml. of Alamine 336 and 42 ml. of commercial heptane. However, because Alamine 336 is a relatively weak amine, the pH could not be raised above the range of 3.3–3.5. The crystals thus formed were collected after 4 hours of stirring and were washed with three 15 ml. portions of commercial heptane. The crystals were dried at 40° C. under a pressure of 2.5 mm. of mercury for about 16 hours. The product consisted of light yellow colored 6-demethyl-7-chlorotetracycline neutral in a yield of 91.2% (calculated as the hydrochloride on an "as is" basis).

What is claimed is:

1. In the process of converting 6-demethyl-7-chlorotetracycline hydrochloride to 6-demethyl-7-chlorotetracycline neutral, the improvement which comprises contacting an aqueous suspension of 6-demethyl-7-chlorotetracycline hydrochloride with a solution of a liquid mixture of amines of the formula:

$$C_nH_{2n+3}N$$

wherein $n$ is an integer from 12 to 26 in an inert water immiscible organic solvent, whereupon 6-demethyl-7-chlorotetracycline neutral is obtained.

2. In the process of converting 6-demethyl-7-chlorotetracycline hydrochloride to 6-demethyl-7-chlorotetracycline neutral, the improvement which comprises contacting an aqueous suspension of 6-demethyl-7-chlorotetracycline hydrochloride with a solution of a liquid mixture of amines of the formula:

$$C_nH_{2n+3}N$$

wherein $n$ is an integer from 12 to 26 in an inert water immiscible organic solvent, said liquid mixture consisting essentially of amines of said formula wherein $n$ is from 18 to 22, whereupon 6-demethyl-7-chlorotetracycline neutral is obtained.

3. In the process of converting 6-demethyl-7-chlorotetracycline hydrochloride to 6-demethyl-7-chlorotetracycline neutral, the improvement which comprises contacting an aqueous suspension of 6-demethyl-7-chlorotetracycline hydrochloride with a solution of a liquid mixture of amines of the formula:

$$C_nH_{2n+3}N$$

wherein $n$ is an integer from 12 to 26 in an inert water immiscible organic solvent, said liquid mixture consisting essentially of di(2-ethylhexyl)amine, whereupon 6-demethyl-7-chlorotetracycline neutral is obtained.

4. In the process of converting 6-demethyl-7-chlorotetracycline hydrochloride to 6-demethyl-7-chlorotetracycline neutral, the improvement which comprises contacting an aqueous suspension of 6-demethyl-7-chlorotetracycline hydrochloride with a solution of a liquid mixture of amines of the formula:

$$C_nH_{2n+3}N$$

wherein $n$ is an integer from 12 to 26 in an inert water immiscible organic solvent, said liquid mixture consisting essentially of tricaprylamine, whereupon 6-demethyl-7-chlorotetracycline neutral is obtained.

References Cited by the Examiner

UNITED STATES PATENTS

| | | | |
|---|---|---|---|
| 2,671,806 | 3/1954 | Winterbottom et al. | 260—559 |
| 2,763,682 | 9/1956 | Winterbottom et al. | 260—559 |
| 3,005,025 | 10/1961 | McCormick et al. | 260—559 |
| 3,050,558 | 8/1962 | Smith et al. | 260—559 |
| 3,053,893 | 9/1962 | Muller | 260—559 |

NICHOLAS S. RIZZO, *Primary Examiner.*